(12) United States Patent
Bouvet et al.

(10) Patent No.: US 7,924,945 B2
(45) Date of Patent: Apr. 12, 2011

(54) ITERATIVE RECEIVING METHOD FOR A MIMO SYSTEM, AND CORRESPONDING RECEIVER AND COMPUTER PROGRAM

(75) Inventors: Pierre-Jean Bouvet, Rennes (FR); Maryline Helard, Rennes (FR); Vincent Le Nir, Flers (FR)

(73) Assignee: France Telecom, Paris (FR)

( * ) Notice: Subject to any disclaimer, the term of this patent is extended or adjusted under 35 U.S.C. 154(b) by 834 days.

(21) Appl. No.: 11/667,200

(22) PCT Filed: Oct. 17, 2005

(86) PCT No.: PCT/EP2005/055321
§ 371 (c)(1), (2), (4) Date: May 4, 2007

(87) PCT Pub. No.: WO2006/048374
PCT Pub. Date: May 11, 2006

(65) Prior Publication Data
US 2007/0280371 A1 Dec. 6, 2007

(30) Foreign Application Priority Data
Nov. 4, 2004 (FR) .................................... 04 11787

(51) Int. Cl.
*H03K 9/00* (2006.01)
*H04L 27/00* (2006.01)
*H04B 1/00* (2006.01)
(52) U.S. Cl. ........................................ 375/316; 375/349
(58) Field of Classification Search .................... 375/316
See application file for complete search history.

(56) References Cited

U.S. PATENT DOCUMENTS
6,813,219 B1 11/2004 Blackmon .................... 367/134
(Continued)

FOREIGN PATENT DOCUMENTS
EP 0824812 2/1998
(Continued)

OTHER PUBLICATIONS
"Diversity and equalization in frequency domain a robust and flexible receiver technology for broadband mobile communication systems". Vehicular Technology Conference, 1997, IEEE 47th Phoenix AZ, uSA May 4-7, 1997, New York, NY, USA, IEEE, US, vol. 2, May 4, 1997.
(Continued)

*Primary Examiner* — David C Payne
*Assistant Examiner* — Erin M File
(74) *Attorney, Agent, or Firm* — David D. Brush; Westman, Champlin & Kelly, P.A.

(57) ABSTRACT

The disclosure relates to a method for receiving a data signal by $N_R$ receiving antennas. The data signal undergoes, before transmission, a channel coding and is transmitted on $N_T$ antennas each transmitting a portion of this signal. Upon reception the transmission channel between the transmitting antennas and the receiving antennas is estimated. The method of the aforementioned type involves at least one iteration for improving an estimation of the received signal according to the received signal and involves a preceding estimation of said received signal, comprising the following steps: filtering this received signal; determining an interference affecting the received signal while furnishing an estimated interference; subtracting this estimated interference form the filtered signal whereby obtaining an improved signal; equalizing this improved signal and furnishing an equalized signal, and; estimating, from this equalized signal, the emitted data signal, called the estimated signal.

10 Claims, 5 Drawing Sheets

U.S. PATENT DOCUMENTS

| | | | |
|---|---|---|---|
| 2003/0137926 A1* | 7/2003 | Joo et al. | 370/203 |
| 2004/0001564 A1* | 1/2004 | Chan et al. | 375/341 |
| 2004/0161058 A1* | 8/2004 | Ebiko et al. | 375/340 |
| 2005/0152266 A1* | 7/2005 | Hwang et al. | 370/210 |
| 2005/0281357 A1* | 12/2005 | Bouvet et al. | 375/340 |

FOREIGN PATENT DOCUMENTS

| | | | |
|---|---|---|---|
| EP | | 1453262 A1 | 9/2004 |
| WO | WO 2004/057765 | | 7/2004 |

OTHER PUBLICATIONS

"An em-based channel estimation algorithm for space-time and space-frequency block coded often". 2003 IEEE International Conference of Acoustics, Speech and Signal Processing. Proceedings. (ICASSP). Hong Kong, Apr. 6-10, 2003. IEEE International Conference on Acoustics, Speech and Signal Processing. Proceedings. (ICAPSSP), New York, NY: IEEE US, vol. 1 of 6, Apr. 6, 2003.

"Space-Time Bit-Interleaved Coded Modulation with an Iterative Decoding Strategy". A. M. Tonello. Proceedings of VTC Fall '00, Boston, USA, Sep. 2000.

Written Opinion dated May 22, 2007 for counterpart foreign application No. PCT/EP2005/055321 filed Oct. 17, 2005.

French Search Report dated Jun. 30, 2005 for counterpart foreign application No. FR 04/11787 filed Nov. 4, 2004.

Le Floch, M. Alard, C. Berrou, "Coded Orthogonal Frequency Division Multiplex" B. Proceedings of the IEEE, vol. 83, N° 6, Jun. 1995.

* cited by examiner

ITERATIVE RECEIVING METHOD FOR A MIMO SYSTEM, AND CORRESPONDING RECEIVER AND COMPUTER PROGRAM

CROSS-REFERENCE TO RELATED APPLICATION

This Application is a Section 371 National Stage Application of International Application No. PCT/EP2005/055321, filed Oct. 17, 2005, and published as WO 2006/048374 A1 on May 11, 2006, not in English.

FIELD OF THE DISCLOSURE

The field of the disclosure is that of digital communications. More specifically, the disclosure relates to a technique of iterative receiving for a system of digital communications comprising the following at emission: channel encoding and space multiplexing in a multiple-antenna transmission context also called a MIMO ("Multiple Input Multiple Output") system.

The disclosure relates more particularly but not exclusively to a technique for the reception of a signal emitted according to the emission scheme proposed by A. M. Tonello in "Space-Time Bit-Interleaved Coded Modulation with an Iterative Decoding Strategy", Proceedings of VTC Fall '00, Boston, USA, September 2000. An emission scheme of this kind, more commonly called ST-BICM, is illustrated in FIG. 1.

The signal 10 to be emitted undergoes a channel encoding CC 11, and then an interleaving II 12. It then goes through a mapping module M 13, designed to convert binary elements into complex symbols: such a module thus associates a group of bits with a complex symbol belonging to a constellation (of the QPSK, 64QAM or other types). The sequence of symbols delivered at output of the mapping module M 13 is commonly called an M-ary signal. Then, a series-parallel conversion S/P 14 is performed, by which each symbol coming from the mapping module M 13 is demultiplexed on the different emission antennas $15_1$, $15_2$ to $15_{Nt}$.

According to this technique of ST-BICM modulation, different symbols are therefore emitted simultaneously on each of the $N_t$ emission antennas. At reception, each of the $N_R$ receiving antennas, where $N_R \geq N_t$, receives a linear combination of the symbols emitted, and affected by disturbances and interferences related to the transmission channel.

BACKGROUND

The receiver associated with this ST-BICM emission scheme, proposed by Tonello in the above-mentioned article, is iterative, as illustrated in FIG. 2. It is fed with signals received on each of the $N_R$ receiving antennas referenced $25_1$, $25_2$ to $25_{NR}$, and comprises a first space-time "MIMO demapping" module 23 (MIMO $M^{-1}$) using an ML (maximum likelihood) type algorithm analyzing especially the log likelihood ratio (LLR) on each encoded bit. A "demapping" module $M^{-1}$ 23 such as this performs an operation that is appreciably the reverse of that of the "mapping" module M 13 and has $N_t$ outputs, where $N_t$ is the number of emission antennas that supply a parallel/series conversion P/S module $24_1$, then a de-interleaving module $22_1$.

The log likelihood ratios derived from the MIMO demapping module $M^{-1}$ 23 are then improved via a SOVA (Soft Output Viterbi Algorithm) type channel decoder $CC^{-1}$ 21 and again sent to the "MIMO demapping" module $M^{-1}$ 23, after a new interleaving II $22_2$, and a new series/parallel conversion S/P $24_2$. This process is reiterated in order to improve the decoded data.

In this reception technique, it is therefore sought by maximum likelihood to find out which symbol of the constellation has been emitted on each of the antennas. The use of such a receiver requires a preliminary initializing phase during which each of the transmission channels between the $N_t$ emission antennas and the $N_R$ receiving antennas is estimated in emitting symbols of which the receiver has a priori knowledge.

One drawback of this prior art iterative technique is its complexity of implementation owing to the use of a maximum likelihood type of algorithm at reception. Such an algorithm entails exhaustive computation of all the sequences of received symbols possible and a selection, from among these sequences, of the most likely one. The complexity of such an algorithm increases exponentially as a function of the number of emission antennas, the number of receiving antennas and the size of the constellation used (or again the number of states of the modulation).

SUMMARY

A method is provided for the reception of a data signal, implementing $N_R$ receiving antennas, where $N_R$ is greater than or equal to 2, said data signal having undergone a channel encoding before emission and being emitted on $N_T$ emission antennas, where $N_T$ is greater than or equal to 2, each of said antennas emitting a part of said signal, said reception method implementing a step of estimation of the transmission channel between said emission antennas and said receiving antennas.

According to an embodiment of the invention, a reception method of this kind has at least one iteration for the improvement of an estimation of the received signal, depending on said received signal and a preceding estimation of said received signal, said iteration comprising the steps of:
  filtering said received signal, delivering a filtered signal;
  determining an interference affecting said received signal, implementing a multiplication of said preceding estimation of said received signal by a matrix representing interferences due to the transmission channel for the transmission of said received signal, said determining operation delivering an estimated interference;
  subtracting said estimated interference from said filtered signal so as to obtain an improved signal;
  equalizing said improved signal, delivering an equalized signal;
  estimating the data signal emitted, called an estimated signal, from said equalized signal.

Thus, an embodiment of the invention relies on a wholly novel and inventive approach to the reception of a data signal having undergone a channel encoding at emission and a space multiplexing in an MIMO type digital communications system having $N_t$ emission antennas and $N_R$ receiving antennas.

Indeed, an exemplary embodiment of the invention proposes a reception technique that is far simpler than the prior art techniques since it does not implement a maximum likelihood (ML) MIMO equalization as proposed by Tonello in the above-mentioned article but relies on a filter-based linear equalization. Through this reduced complexity, it is therefore far better adapted to the MIMO systems having a large number of emission and/or receiving antennas and to large constellations having a large number of modulation states.

Furthermore, according to the reception technique of an exemplary embodiment of the invention, it is not necessary to perform as many channel-decoding operations as there are emission antennas, a single block channel decoding operation being sufficient.

Finally, the technique of an exemplary embodiment of the invention is less complex then an iterative reception technique adapted to a system of emission implementing a linear pre-encoding of the data signal. It can be noted that the signal received according to an exemplary embodiment of the invention has not undergone any pre-encoding before emission, so that the reception method does not implement any de-pre-encoding of the received signal (the term "de-pre-encoding" is understood here and throughout the rest of the document to refer to the operation that is the reverse of the pre-encoding operation performed at emission).

The reception technique of an exemplary embodiment of the invention relies more specifically on a linear MIMO equalization with interference cancellation according to which the interferences affecting the received signal are rebuilt in using notably channel encoding and then subtracting them from the filtered signal so as to obtain an improved signal. The estimation of the interference is done iteratively, in taking account of a preceding estimation of the receipt signal. The improved signal is then equalized, and then estimated. This estimation of the signal is then used for the next iteration of improvement.

The estimation of the interference uses an interference matrix which, for example, takes account solely of the matrix representing the transmission channel as opposed to the case where the signal would undergo a linear pre-encoding before emission, wherein the interference matrix would be also dependent on a de-pre-encoding matrix.

The matrix representing the transmission channel, also called a channel equivalent matrix, may take account notably of a space and/or time multiplexing implemented at emission. In a MIMO type system, it also takes account of the inter-symbol interference due to the different paths in the propagation channel.

Advantageously, said filtering of said received signal implements a multiplication of said received signal by a conjugate transpose matrix of a matrix representing said transmission channel.

Preferably, the first improvement iteration implements an initial estimation of said received signal comprising the steps of:
  initial equalization of said received signal by multiplication of a total equalization matrix taking account of at least said matrix representing said transmission channel, delivering an equalized initial signal;
  initial estimation of said received signal from said equalized initial signal.

It is indeed necessary to initialize the iterative process of an exemplary embodiment of the invention, no previously estimated M-ary signal being as yet available. The result of this initial estimation then provides the following iterations of the method.

Preferably, when said transmission channel is frequency selective, said data signal emitted on each of said emission antennas is a multiple-carrier signal and said iteration comprises a preliminary step of multiple-carrier demodulation on each of said receiving antennas.

Indeed, in carrying out a multiple-carrier modulation before emission and a multiple-carrier demodulation at reception, a channel equivalent to a frequency non-selective channel is obtained for each sub-carrier of the modulation in which the data signal therefore does not undergo any inter-symbol interference or undergoes little inter-symbol interference.

Advantageously, at least one of said steps of estimation of the received signal delivers on the one hand a binary estimation of said received signal and, on the other hand, a weighted estimation of said received signal, said weighted estimation being used for the following iteration, if it exists.

Depending on the application considered, it is possible to extract and use such a binary estimation of the received signal at each iteration of the method (for statistical purposes for example, or to supply a particular processing unit) or only certain ranks for example at the end of the iterative process.

According to a preferred characteristic, a reception method of this kind also comprises a step for the estimation of a noise affecting said transmission channel and, when said equalization is of the MMSE ("Minimum Mean Square Error") type, said total equalization matrix also takes account of said estimated noise.

According to one advantageous variant, said equalization is of a "Zero Forcing" (ZF) type constituting a promising alternative to MMSE equalization because of its lower complexity.

Advantageously, a reception method of this kind also has at least one automatic gain control (AGC) step preceding said equalization steps, thus improving the performance of the iterative method of an exemplary embodiment of the invention.

An exemplary embodiment of the invention also relates to a receiver of a data signal, implementing the iterative reception method described here above. Such a receiver comprises among others means to improve an estimation of the received signal, depending on said received signal and a preceding estimation of said received signal, comprising at least two elementary modules driven successively, each of said elementary modules comprising:
  means of filtering said received signal, delivering a filtered signal;
  means of determining an interference affecting said received signal, implementing a multiplication of said preceding estimation of said received signal by a matrix representing interferences due to the transmission channel for the transmission of said received signal, said determining means delivering an estimated interference;
  means of subtracting said estimated interference from said filtered signal so as to obtain an improved signal;
  means of equalizing said improved signal, delivering an equalized signal;
  means of estimating the data signal emitted, called an estimated signal, from said equalized signal.

An exemplary embodiment of the invention also pertains to a computer program product comprising instruction sequences adapted to the implementation of a reception method as described here above when said program is executed on a computer.

BRIEF DESCRIPTION OF THE DRAWINGS

Other features and advantages shall appear more clearly from the following description of a preferred embodiment, given by way of a simple illustrative and non-restrictive example, and from the appended drawings.

DETAILED DESCRIPTION OF ILLUSTRATIVE EMBODIMENTS

The general principle of an exemplary embodiment of the invention relies on an iterative reception of a data signal that has undergone channel encoding (but not pre-encoding) in a MIMO type system implementing an iterative estimation of the interferences generated by the channel encoding. The estimated interference, rebuilt from a previous estimation, is then subtracted from the received signal so as to eliminate its contribution. Thus, linear equalization of the received signal, whose implementation is of low complexity, is performed.

Figure 1:
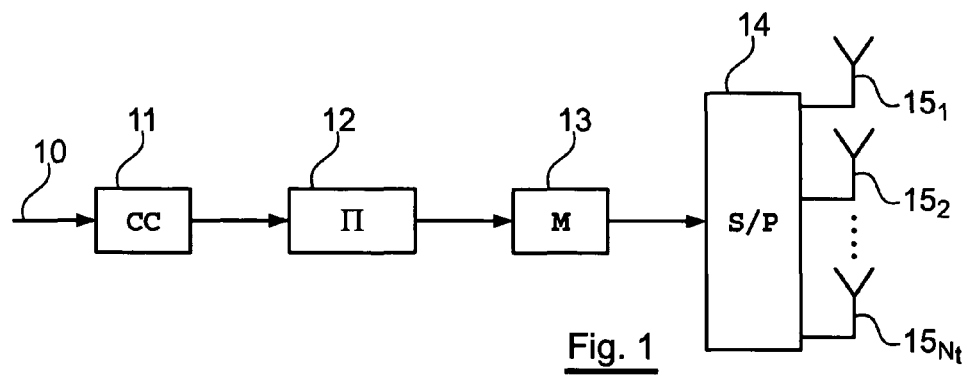
FIG. 1, already commented upon in relation to the prior art is a block diagram of an ST-BICM type emission scheme as proposed by Tonello in the above-mentioned article.
Figure 2:
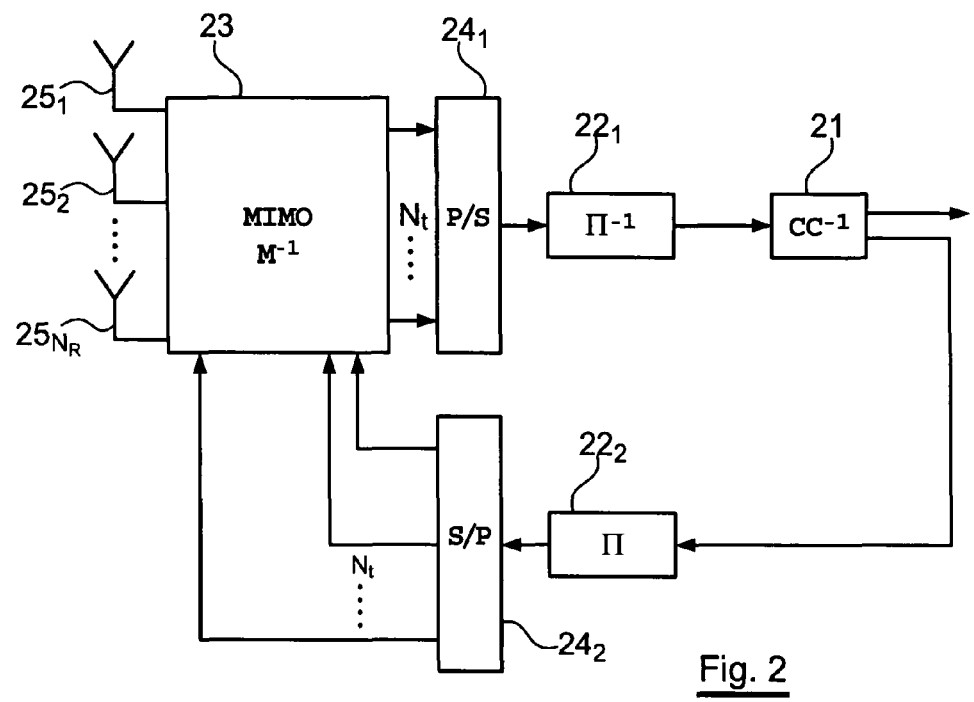
FIG. 2, also commented upon in relation to the prior art, illustrates the architecture of an iterative receiver proposed by Tonello in the above-mentioned article and adapted to the emission scheme of FIG. 1.
Figure 3:
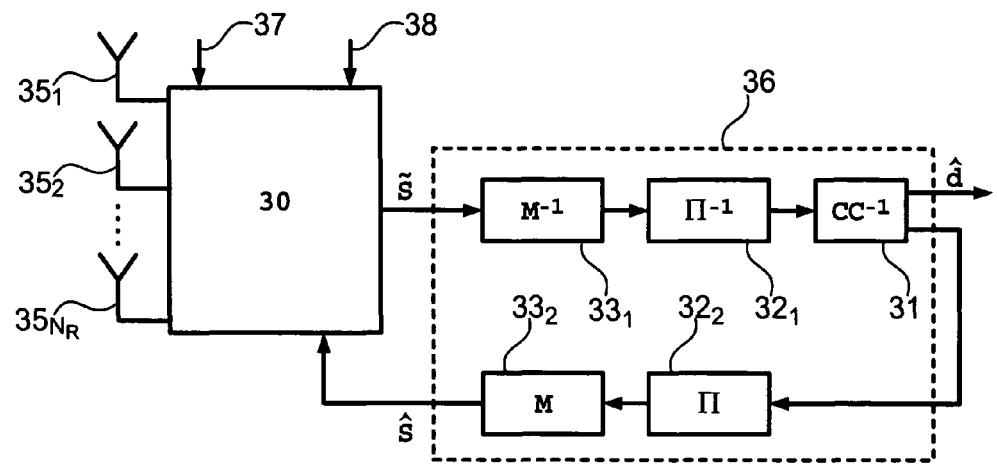
FIG. 3 is a block diagram of the principle of iterative reception of an exemplary embodiment of the invention.

It will be noted that the elements shown in FIGS. 1 to 9 are referenced as follows: the first number in the reference is the number of the figure. The following numbers in the reference designate the element within the figure, a same element being generally numbered in the same way in the different figures. For example, a symbol estimation block 36 in FIG. 3 is designated by the reference 56 in FIG. 5 and by the reference 66 in FIG. 6.

Referring to FIG. 3, the principle of iterative reception of an exemplary embodiment of the invention is presented.

A signal r is received on $N_R$ receiving antennas referenced $35_1$ to $35_{N_R}$. Such a signal has undergone a channel encoding and space multiplexing at emission and has been emitted on $N_t$ emission antennas where $N_R \geq N_t$, as illustrated for example in FIG. 2 described here above. Each receiving antenna $35_1$ to $35_{N_R}$ receives a linear combination of the symbols emitted on each of the $N_t$ emission antennas.

It is assumed first of all in the example of FIG. 3 that the MIMO channel is frequency non-selective so that the signal is not affected by inter-symbol interference (ISI). A description shall be given here below, with reference to FIGS. 7 and 8, of an alternative embodiment of the invention when this hypothesis is not verified.

The reception method of an exemplary embodiment of the invention consists in working iteratively and carrying out, first of all, a MIMO equalization 30 and then a symbol estimation 36.

When the reception system of FIG. 3 is initialized, it is possible for example to send symbols known a priori by the receiver on the $N_t$ emission antennas in order to estimate the transfer functions of the different transmission channels between each of the $N_t$ emission antennas and $N_R$ receiving antennas. The result of this channel estimation 37 is then input into the MIMO equalization block 30. A channel estimation of this kind is performed by means of classic algorithms known to those skilled in the art and shall therefore not be described herein in greater detail.

A MIMO equalization block 30 such as this may use different equalization techniques that shall be described in greater detail here below in this document. When the technique implemented in the equalization bloc referenced 30 is of the MMSE (Minimum Mean Square Error) type, it is also necessary to give this equalization block 30 a noise estimation 38 in the form of a signal-to-noise ratio (or SNR) for example. Such a noise estimation is also classic and well known to those skilled in the art and the method used for this estimation shall therefore not be described in greater detail.

The equalization block MIMO 30 delivers an equalized M-ary signal $\tilde{s}$. It may be recalled that an M-ary signal is a sequence of complex symbols belonging to a constellation (of the QPSK, 16QAM, or other type).

This equalized signal $\tilde{s}$ is then input into a symbol estimation block 36 in which it undergoes de-mapping operations $M^{-1}$ $33_1$, de-interleaving operations $\Pi^{-1}$ $32_1$ and channel-decoding operations $CC^{-1}$ 31. At output of this symbol estimation 36, an estimated binary signal $\hat{d}$ is obtained. This signal may or may not be exploited depending on the application envisaged.

Since the method is iterative, this estimated binary signal $\hat{d}$ is made to undergo a new interleaving $\Pi$ $32_2$ and a new mapping M $33_2$, in order to obtain an estimated M-ary signal $\hat{s}$, which can be reinjected into the MIMO equalization block 30 for a following iteration of improvement of the received signal. This signal $\hat{s}$ may also be extracted to undergo successive processing operations when the successive iterations of the reception method are ended with an adequate quality of signal having been achieved (for example at the end of 5 iterations as illustrated by the simulation curves of FIG. 10).

Figure 4:
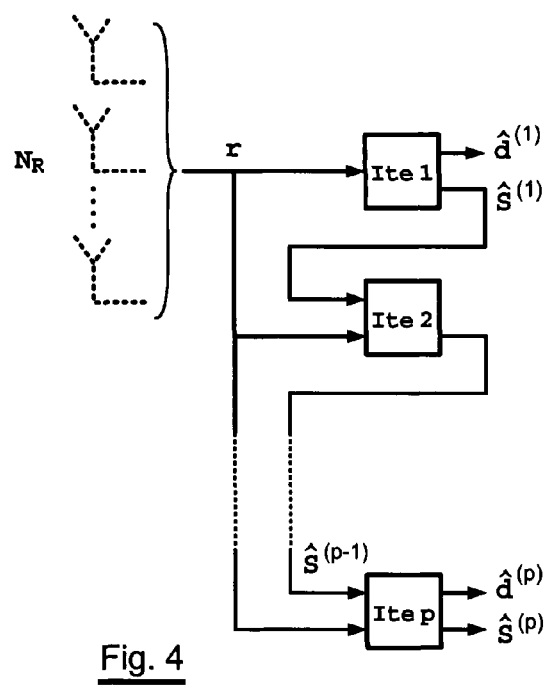
FIG. 4 illustrates the different elementary modules of a receiver implementing the principle of FIG. 3.
Figure 5:
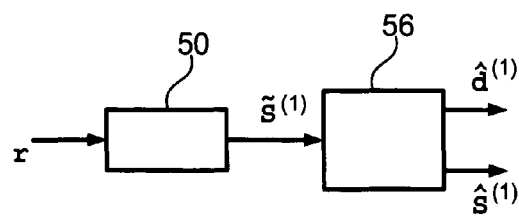
FIG. 5 shows the elementary module of the receiver of FIG. 4 implemented during the first iteration of improvement of the estimation of the received signal.

FIG. 4 provides a more precise illustration of the architecture of a receiver according to an exemplary embodiment of the invention. Such a receiver is an iterative type of receiver and is constituted by p elementary modules (p>1) referenced Ite1, Ite2 to Itep.

As described here above with reference to FIG. 3, a signal r is received on the $N_R$ receiving antennas of the MIMO system considered. It is input into the first elementary module Ite1 of the receiver, illustrated in FIG. 5, in which it undergoes the first iteration (p=1) of the reception method of an exemplary embodiment of the invention. This first iteration consists of an initialization phase, since no estimated M-ary signal is as yet available, and therefore comprises the following steps:

first of all a total equalization 50 of the received signal r is performed by multiplication by a total equalization matrix $(G+\sigma^2 I)^{-1} H^H$, where H designates the matrix representing the transmission channel, $\sigma^2 = 1/\text{SNR}$ is the variance of the equivalent noise, also equal to the inverse of the mean signal-to-noise ratio (SNR) observed on each receiving antenna, and where $G = H^H \cdot H$ is a total equalization matrix. This equalization 50 delivers an equalized M-ary signal $\tilde{s}^{(1)}$. It will be noted that an MMSE type equalization is considered here, other types of equalization being described further below in this document;

the equalized M-ary signal $\tilde{s}^{(1)}$ is then input into a block 56 for the estimation of the binary signal and of the M-ary signal which, from the equalized M-ary signal, delivers an estimated binary signal $\hat{d}^{(1)}$ (which may be unexploited and is therefore not necessarily available at output) and an estimated M-ary signal $\hat{s}^{(1)}$.

Figure 6:
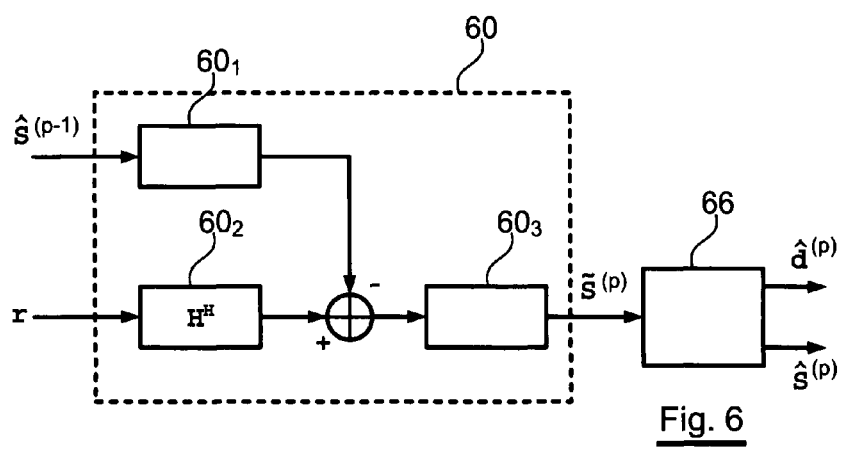
FIG. 6 presents an elementary module of the receiver of FIG. 4 implemented during a following iteration of improvement.

The estimated M-ary signal $\hat{s}^{(1)}$ is then injected into the next elementary module Ite2. FIG. 6 illustrates the structure of an elementary module Itep, where p>1, which comprises a first total equalization block 60 and a second symbol estimation block 66.

The total equalization block 60 receives the estimated M-ary signal $\hat{s}^{(p-1)}$ coming from the previous iteration, and the received signal r at input. It performs the following operations:
- adapted filtering $60_2$ of the received signal r by application of the transconjugate matrix of the channel $H^H$ delivering a filtered signal;
- creation $60_1$ of interferences from a preceding estimated M-ary signal $\hat{s}^{(p-1)}$ by left-multiplication of this preceding estimated M-ary signal by an interference matrix J=G–diag(G). More generally, this interference matrix must at least take account of the channel matrix H;
- subtraction of the interference at output of the block referenced $60_1$ from the filtered signal obtained at output of the filtering block $60_2$ to obtain an improved signal;
- equalization $60_3$ of the improved signal delivering an equalized M-ary signal $\tilde{s}^{(p)}$ by application of the matrix $(diag(G)+\sigma^2 I)^{-1}$. More generally, this equalization matrix must at least take account of the channel matrix H.

The equalized M-ary signal $\tilde{s}^{(p)}$ then feeds the estimation block 66 which carries out the estimation:
- of the emitted binary signal, called an estimated binary signal $\hat{d}^{(p)}$;
- of the emitted M-ary signal called an estimated M-ary signal $\hat{s}^{(p)}$.

The embodiment described here above relies on the implementation of an MMSE type equalization. However, other types of equalization may be used in the context of exemplary embodiments of the invention. Thus, ZF ("Zero Forcing") equalization is a promising alternative because it is less complex. In this case, the equalization block 50 of the first elementary module Ite1 for the first iteration implements the equalization of the received signal r by multiplication of a total equalization matrix $G^{-1}H^H$ (which therefore takes account of the matrix of the channel H, but no longer takes account of the noise) and delivers an equalized M-ary signal $\hat{s}^{(1)}$. Similarly, in the elementary modules Itep, where p>1, the equalization block $60_3$ of the improved signal henceforth performs the equalization of the improved signal by application of the matrix $(diag(G))^{-1}$, to deliver an equalized M-ary signal $\tilde{s}^{(p)}$ at output.

The other functional blocks of the receiver described here above in the context of an MMSE remain unchanged.

It is also possible to plan for the use of MRC ("Maximum Ratio Combining") or EGC ("Equal Gain Combining") equalizations which are well known in the literature.

It is also possible to improve the performance of the iterative method of an exemplary embodiment of the invention in implementing an automatic gain control (AGC) before the above-described equalization steps.

The purpose of the AGC especially is to standardize the energy of the signal to make it unitary and minimize the propagation of errors in the iterations.

In an exemplary embodiment of the invention, this standardization of the energy is done in parallel for the signals received on each of the $N_R$ receiving antennas.

Thus a signal $x_k$ at input of such an AGC is converted into a signal $y_k$ as follows:

$$y_k = \alpha_k \cdot x_k$$

The coefficient $\alpha_k$ may for example be determined by:

$$\begin{cases} G_k = G_{k-1} + \mu(1-|y_k|^2) \\ \alpha_k = \sqrt{G_k} \end{cases}$$

where $\mu$ is the adaptation pitch and where $G_k$ is a temporary variable.

Figure 7:
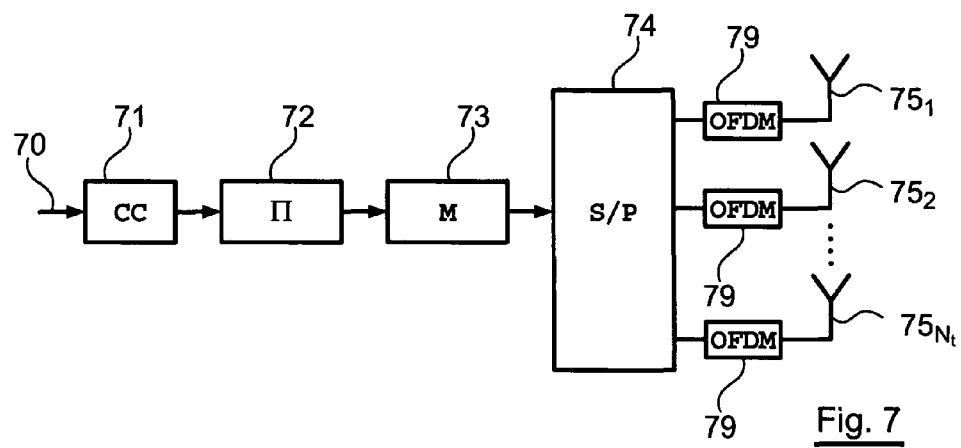
FIGS. 7 and 8 respectively present variants of the emission and reception schemes in the case of a frequency-selective channel.
Figure 8:
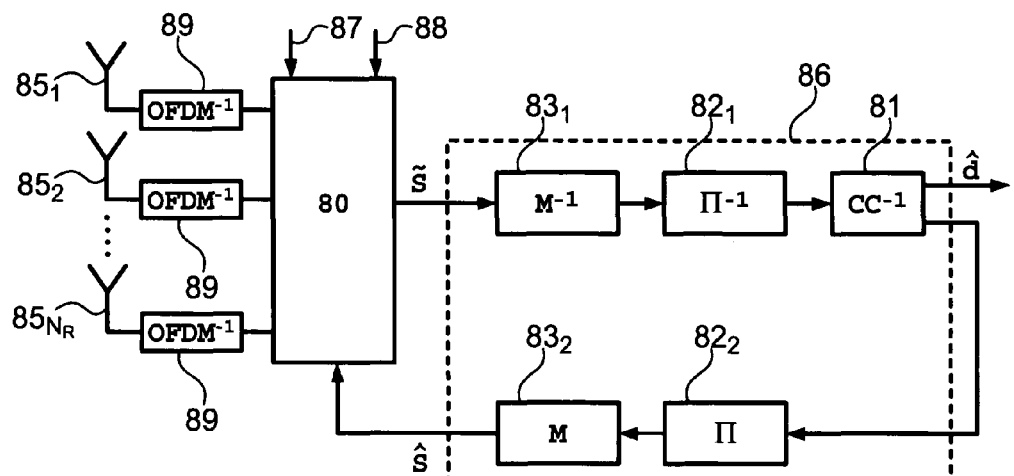

As indicated here above, the embodiment described hitherto applies to a frequency non-selective MIMO channel in which the data signal has undergone little or no inter-symbol interference. Referring to FIGS. 7 and 8, a description shall now be given of an alternative embodiment of the invention where this assumption is not verified.

When the signal is frequency-selective, it is planned to use a multiple-carrier modulation such as the OFDM ("Orthogonal Frequency Division Multiplexing") (described for example by B. Le Floch, M. Alard and C. Berrou, in "Coded Orthogonal Frequency Division Multiplex", Proceedings of the IEEE, Vol. 83, N° 6, June 1995). Indeed a frequency-flat fading channel is equivalent to a multiple-path channel (with frequency fading) for which an OFDM modulation of the signal is performed.

It is also possible to use any other type of multiple-carrier modulation such as a modulation implementing the IOTA prototype function described for example in the European patent document EP 0 824 812.

The emission scheme used is then that of FIG. 7. It differs from the emission scheme described here above with reference to FIG. 1 only in that, after the series/parallel conversion S/P 14, 74, and before the emission of the signal on each of the $N_t$ emission antennas $15_1$ to $15_{Nt}$, $75_1$ to $75_{Nt}$, an OFDM type multiple-carrier modulation 79 is performed on each of the emission channels. The other blocks are identical and shall therefore not be described here in greater detail.

In this variant, the receiver of an exemplary embodiment of the invention is modified according to the scheme of FIG. 8. It differs from the receiver of FIG. 3 only in that the signal received on each of the $N_R$ emission antennas $85_1$ to $85_{N_R}$, before equalization 80, undergoes an OFDM demodulation 89, referenced $OFDM^{-1}$. The other blocks are identical to those of FIG. 3 and are therefore not described here in greater detail.

For example, the OFDM modulation block 79 of FIG. 7 takes $N_{FFT}$ symbols and returns a block of $N_{FFT}+\Delta$ symbols, where $\Delta$ designates the guard interval of the OFDM modulation. The $OFDM^{-1}$ dual operation 89 is performed at reception. Provided that the guard interval $\Delta$ is properly sized (i.e. that it is greater than the maximum delay $\tau_{max}$ of the canal), the equivalent channel corresponding to the set constituted by the OFDM modulator 79, the MIMO propagation channel and the $OFDM^{-1}$ demodulator 89 is equivalent to a frequency non-selective channel for each sub-carrier. It is therefore enough to apply the proposed iterative receiver to each sub-carrier, as explained in greater detail here below.

The following notations are used:
- d: binary signal
- H(k): Matrix of the channel for the sub-carrier k
- $G(k) = H^H(k) \cdot H(k)$: total matrix
- J(k) = G(k) – diag(G(k)): interference matrix
- $\tilde{s}^{(p)}(k)$: M-ary signal equalized at the iteration p for the sub-carrier k
- $\hat{s}^{(p)}(k)$: M-ary signal estimated at the iteration p for the sub-carrier k
- $\hat{d}^{(p)}$: binary signal estimated at the iteration p r(k): signal received after OFDM demodulation on the sub-carrier k $\sigma^2=1/SNR$: variance of the equivalent noise, also equal to the inverse of the mean signal-to-noise ratio (SNR) observed on each antenna.

For the first iteration (p=1), since no M-ary signal is available, an initialization step is performed. For each carrier k, this initialization step comprises the following sub-steps:

equalization 50 of the received signal by multiplication of a total equalization matrix $(G(k)+\sigma^2 I)^{-1}H^H(k)$ delivering an equalized M-ary signal $\tilde{s}^{(1)}(k)$ estimation 56 of the binary signal from the equalized M-ary signal $\tilde{s}^{(1)}(k)$ delivering an estimated binary signal $\hat{d}^{(1)}$;

estimation 56 of the M-ary signal from the equalized signal $\tilde{s}^{(1)}(k)$ delivering an estimated M-ary signal $\hat{s}^{(1)}(k)$.

Figure 9:
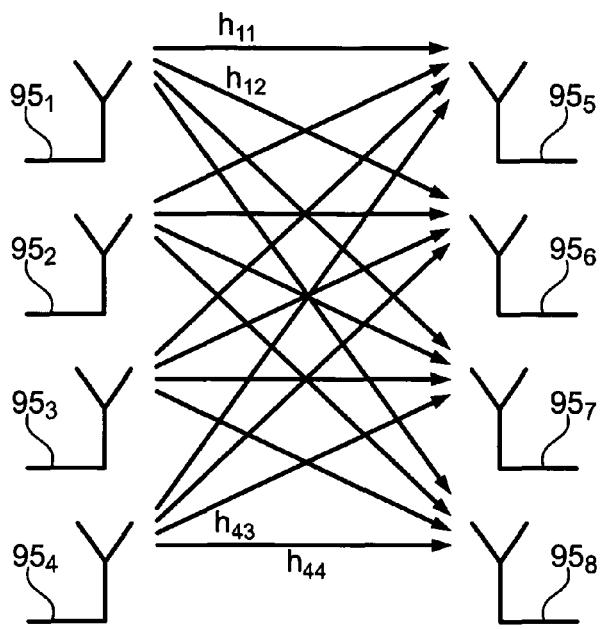
FIG. 9 illustrates the notion of a transmission channel in a MIMO type system.

For the following iterations (p>1), for each carrier k, the following steps are performed:

adapted filtering 60₂ of the received signal r(k) by application of the transconjugate matrix of the channel $H^H(k)$ delivering a filtered signal;

creation 60₁ of interference from a previous estimated M-ary signal $\hat{s}^{(p-1)}(k)$ by left-multiplication of said preceding estimated M-ary signal by an interference matrix J(k) taking account of at least the channel matrix H(k);

subtraction of the interference from the filtered signal delivering an improved signal;

equalization 60₃ of the improved signal delivering an equalized M-ary signal $\tilde{s}^{(p)}(k)$ by application of the matrix $(diag(G(k))+\sigma^2 I)^{-1}$ taking account at least of the channel matrix H(k);

estimation 66 from the equalized M-ary signal of the emitted binary signal called an estimated binary signal $\hat{d}^{(p)}$;

estimation 66 from the equalized signal of the emitted M-ary signal called an estimated M-ary signal $\hat{s}^{(p)}$;

Referring now to FIG. 9, we present an example of an embodiment of the receiver of an exemplary embodiment of the invention adapted to an ST-BICM type emission scheme. An exemplary embodiment of the invention uses $N_t=4$ emission antennas referenced 95₁, 95₂, 95₃ and 95₄ and $N_R=4$ receiving antennas referenced 95₅, 95₆, 95₇ and 95₈. The channel is a flat-fading channel.

The channel matrix used by the iterative system is the following:

$$H = \begin{bmatrix} h_{11} & h_{21} & h_{31} & h_{41} \\ h_{12} & h_{22} & h_{32} & h_{42} \\ h_{13} & h_{23} & h_{33} & h_{43} \\ h_{14} & h_{24} & h_{34} & h_{44} \end{bmatrix},$$

where, as illustrated in FIG. 9, $h_{ij}$ designates the path between the transmission antenna indexed i and the receiving antenna indexed j.

The symbol is estimated 36, 86 as follows:

M-ary/binary conversion $M^{-1}$ 33₁, 83₁ delivering log likelihood ratios on the interleaved encoded binary signal;

de-interleaving $\Pi^{-1}$ 32₁, 82₁ (identical to the interleaving $\Pi$ 12, 72 done at emission) delivering log likelihood ratios on the encoded binary signal;

decoding of the channel $CC^{-1}$ 31, 81 delivering an estimated binary signal as well as a posteriori likelihood values on the encoded binary signal;

interleaving $\Pi$ 32₂, 82₂ of the a posteriori log likelihood ratios on the encoded binary signal delivering a posteriori log likelihood ratios on the interleaved encoded binary signal;

binary/M-ary conversion (mapping) M 33₂, 83₂ delivering an estimated signal $\hat{s}$.

Figure 10:
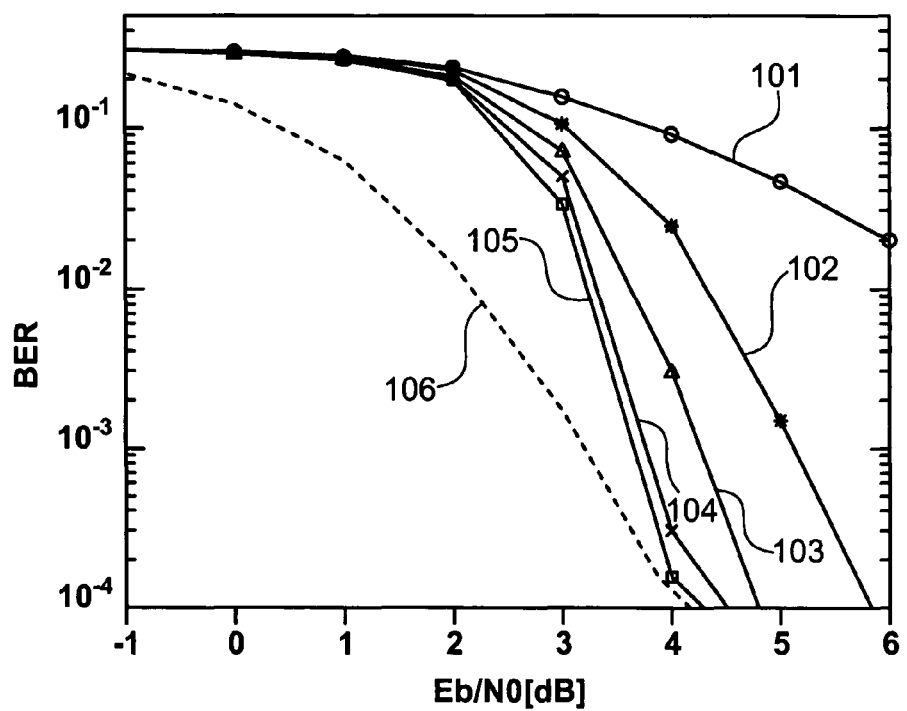
FIG. 10 presents the performance of an iterative receiver of an exemplary embodiment of the invention.

FIG. 10 shows the performance of the reception method of an exemplary embodiment of the invention obtained by simulation from a K=7 type convolutive channel encoder, where K is the constraint length of the code and from a QPSK ("Quadrature Phase Shift Keying") type constellation. The spectral efficiency is therefore η=4 bits/s/Hz.

More specifically, FIG. 10 shows five curves referenced 101 to 105 illustrating the bit error rate (BER) as a function of the ratio Eb/N0 (corresponding to the ratio between the energy expended per transmitted bit and the spectral density of the white noise) expressed in decibels (dB) for the five first iterations of the receiver of an exemplary embodiment of the invention. Thus, the curve referenced 101 corresponds to the first iteration, the curve referenced 102 corresponds to the second iteration and so on and so forth until the curve referenced 105 which corresponds to the fifth iteration of the iterative receiver of an exemplary embodiment of the invention.

The curve referenced 106 in FIG. 10 corresponds for its part to the optimum theoretical performance curve for a system for the reception of an ST-BICM type signal.

As illustrated by FIG. 10, the receiver of an exemplary embodiment of the invention performs satisfactorily since it converges at the end of about four iterations. The convergence is furthermore relatively rapid. At about Eb/N0=4 dB, the process converges to the optimum curve 106 (as illustrated by the approaching together of the curves referenced 105 and 106), showing that the receiver of an exemplary embodiment of the invention is performing very well.

Besides, an ML type receiver (as proposed by Tonello for example and illustrated in FIG. 2) can not exceed the limits of performance illustrated by the curve referenced 106: it can therefore be deduced from this that the performance of the receiver of an exemplary embodiment of the invention with high signal-to-noise ratio is equivalent to that given by the prior art receiver proposed by Tonello, for a lower degree of complexity.

It should be noted that the invention is not limited to a purely hardware implantation but can also be implemented in the form of a sequence of instructions of a computer program or any form combining a hardware part and a software part. Should the invention be implemented partially or totally in software form, the corresponding sequence of instructions could be stored in a storage means that is detachable (for example a floppy disk, a CD-ROM or a DVD-ROM) or not detachable, this storage means being partially or totally readable by a computer or a microprocessor.

An exemplary embodiment of the disclosure provides a reception technique for a space-time encoded modulation system that is simpler than the iterative reception technique proposed by A. M. Tonello in "Space-Time Bit-Interleaved Coded Modulation with an Iterative Decoding Strategy", Proceedings of VTC Fall '00, Boston, USA, September 2000.

An exemplary embodiment proposes an iterative reception technique of this kind that is well suited to ST-BICM modulations and more generally to MIMO type transmission systems.

An exemplary embodiment provides a technique of this kind that remains at a reduced level of complexity (presenting for example linear complexity) even when the number of emission and/or receiving antennas is high and/or when the size of the constellation used is great.

An exemplary embodiment proposes a technique of this kind that can be implemented in receivers whose architecture is simpler than that of prior art receivers. In particular, an embodiment provides a receiver in which the number of elementary modules (of the channel decoder, de-interleaver and other types) working in parallel is smaller than the number of emission antennas in the system.

An exemplary embodiment provides a technique of this kind that is adapted as much to transmission channels without inter-symbol interference as to frequency-selective channels.

An exemplary embodiment proposes a reception technique of this kind whose performance is at least equivalent to that of the more complex techniques of the prior art.

Although the present disclosure has been described with reference to preferred embodiments, workers skilled in the art will recognize that changes may be made in form and detail without departing from the spirit and scope of the disclosure.

The invention claimed is:

1. Method for the reception of a data signal, implementing $N_R$ receiving antennas, where $N_R$ is greater than or equal to 2, said data signal having undergone a channel encoding and a spatial multiplexing before emission and being emitted on $N_T$ emission antennas, where $N_T$ is greater than or equal to 2, each of said antennas emitting a part of said signal, wherein said reception method comprises:

estimating a transmission channel between said emission antennas and said receiving antennas; and at least one iteration to improve an estimation of the received signal, depending on said received signal and a preceding estimation of said received signal, said iteration comprising the steps of:

filtering said received signal, delivering a filtered signal;

determining an interference affecting said received signal, implementing a multiplication of said preceding estimation of said received signal by a matrix representing interferences due to the transmission channel for the transmission of said received signal, said determining operation delivering an estimated interference;

subtracting said estimated interference from said filtered signal so as to obtain an improved signal;

equalizing said improved signal, delivering an equalized signal; and estimating the data signal emitted, called an estimated signal, from said equalized signal.

2. Reception method according to claim 1, wherein said filtering of said received signal implements a multiplication of said received signal by a conjugate transpose matrix of a matrix representing said transmission channel.

3. Reception method according to claim 1, wherein the at least one iteration comprises a first iteration to improve, which implements an initial estimation of said received signal comprising the steps of:

initial equalization of said received signal by multiplication of a total equalization matrix taking account of at least said matrix representing said transmission channel, delivering an equalized initial signal; and initial estimation of said received signal from said equalized initial signal.

4. Reception method according to claim 1, wherein, when said transmission channel is frequency selective, said data signal emitted on each of said emission antennas is a multiple-carrier signal and in that said iteration comprises a preliminary step of multiple-carrier demodulation on each of said receiving antennas.

5. Reception method according to claim 1, wherein at least one of said steps of estimation of the received signal delivers a binary estimation of said received signal and a weighted estimation of said received signal, said weighted estimation being used for the following iteration, if it exists.

6. Reception method according to claim 1, wherein the method also comprises a step of estimation of a noise affecting said transmission channel and, when said equalization is of a MMSE ("Minimum Mean Square Error") type, said total equalization matrix also takes account of said estimated noise.

7. Reception method according to claim 1, wherein said equalization is of a "zero forcing" (ZF) type.

8. Reception method according to claim 1, wherein the method also comprises at least one automatic gain control (AGC) step preceding said equalization steps.

9. Data signal receiver comprising:

$N_R$ receiving antennas, where $N_R$ is greater than or equal to 2, for receiving a data signal having undergone a channel encoding and a spatial multiplexing before emission and being emitted on $N_T$ emission antennas, where $N_T$ is greater than or equal to 2, each of said emission antennas emitting a part of said signal;

a transmission channel estimator, which estimates a transmission channel between said emission antennas and said receiving antennas;

at least two elementary modules driven successively, which are adapted to improve an estimation of the received signal depending on said received data signal and a preceding estimation of said received data signal, each of said elementary modules comprising:

a filter, which filters said received signal and delivers a filtered signal;

an interference estimator, which determines an interference affecting said received data signal, implementing a multiplication of said preceding estimation of said received data signal by a matrix representing interferences due to the transmission channel for the transmission of said received data signal, said interference estimator delivering an estimated interference;

a subtractor, which subtracts said estimated interference from said filtered signal so as to obtain an improved signal;

an equalizer, which equalizes said improved signal, delivering an equalized signal; and a data signal estimator, which estimates the data signal emitted, called an estimated signal, from said equalized signal.

10. Computer program product comprising instruction sequences adapted to the implementation of a reception method when said program is executed on a computer, wherein the reception method comprises:

implementing $N_R$ receiving antennas, where $N_R$ is greater than or equal to 2, for receiving a data signal, said data signal having undergone a channel encoding and a spatial multiplexing before emission and being emitted on $N_T$ emission antennas, where $N_T$ is greater than or equal to 2, each of said antennas emitting a part of said signal;

estimating a transmission channel between said emission antennas and said receiving antennas; and at least one iteration to improve an estimation of the received signal, depending on said received signal and a preceding estimation of said received signal, said iteration comprising the steps of:

filtering said received signal, delivering a filtered signal;

determining an interference affecting said received signal, implementing a multiplication of said preceding estimation of said received signal by a matrix representing interferences due to the transmission channel for the transmission of said received signal, said determining operation delivering an estimated interference;

subtracting said estimated interference from said filtered signal so as to obtain an improved signal;

equalizing said improved signal, delivering an equalized signal; and estimating the data signal emitted, called an estimated signal, from said equalized signal.

* * * * *

UNITED STATES PATENT AND TRADEMARK OFFICE
CERTIFICATE OF CORRECTION

PATENT NO. : 7,924,945 B2  Page 1 of 1
APPLICATION NO. : 11/667200
DATED : April 12, 2011
INVENTOR(S) : Pierre-Jean Bouvet et al.

It is certified that error appears in the above-identified patent and that said Letters Patent is hereby corrected as shown below:

On the Title Page

Item (57) Abstract:

In line 13 of the Abstract, delete "form" and insert -- from --

Signed and Sealed this
Twenty-third Day of June, 2015

Michelle K. Lee
*Director of the United States Patent and Trademark Office*